March 6, 1962 G. A. SEEWER 3,023,714
CONTROL MECHANISM FOR TRANSMISSIONS AND THE LIKE
Filed Oct. 21, 1958 2 Sheets-Sheet 1
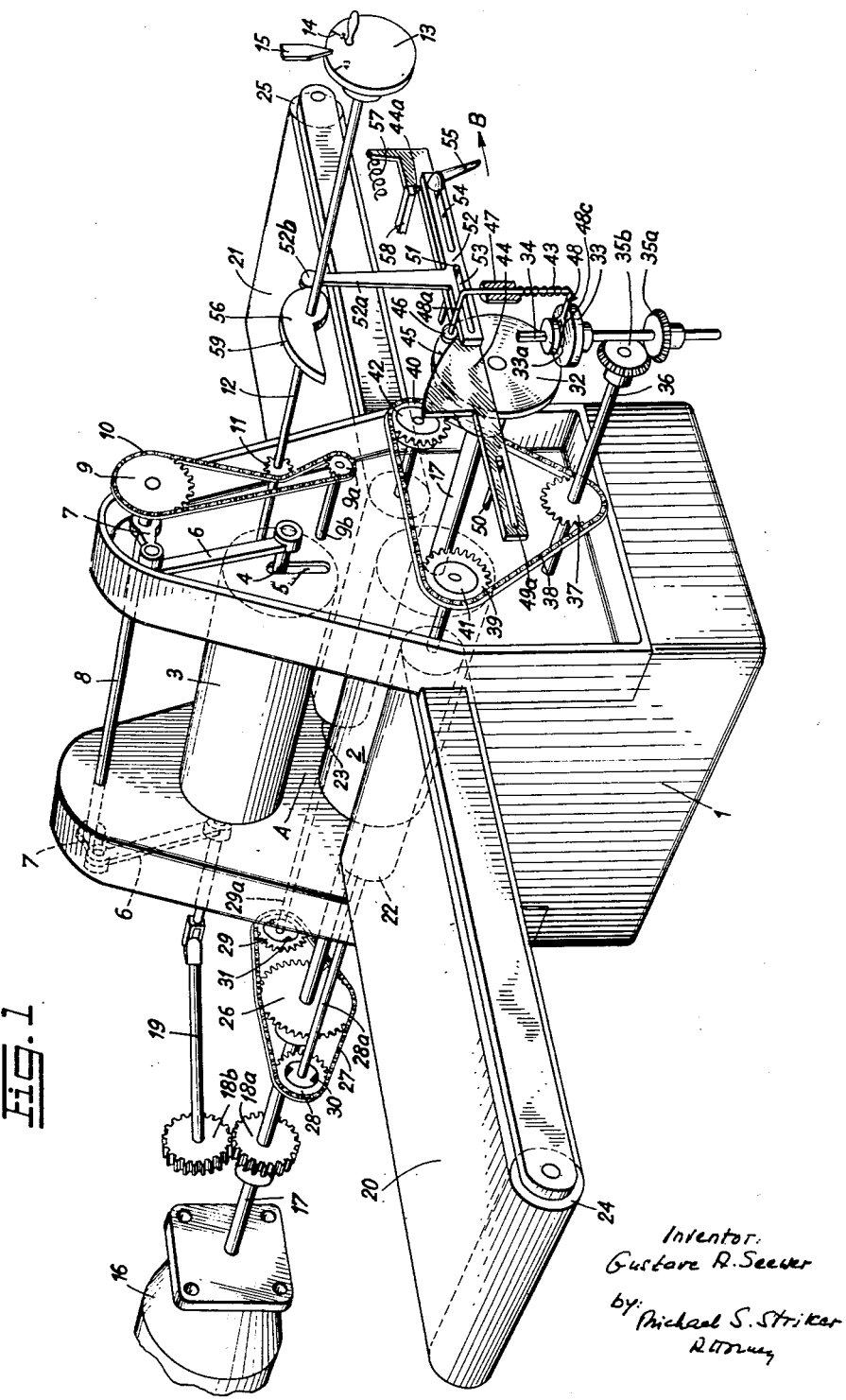

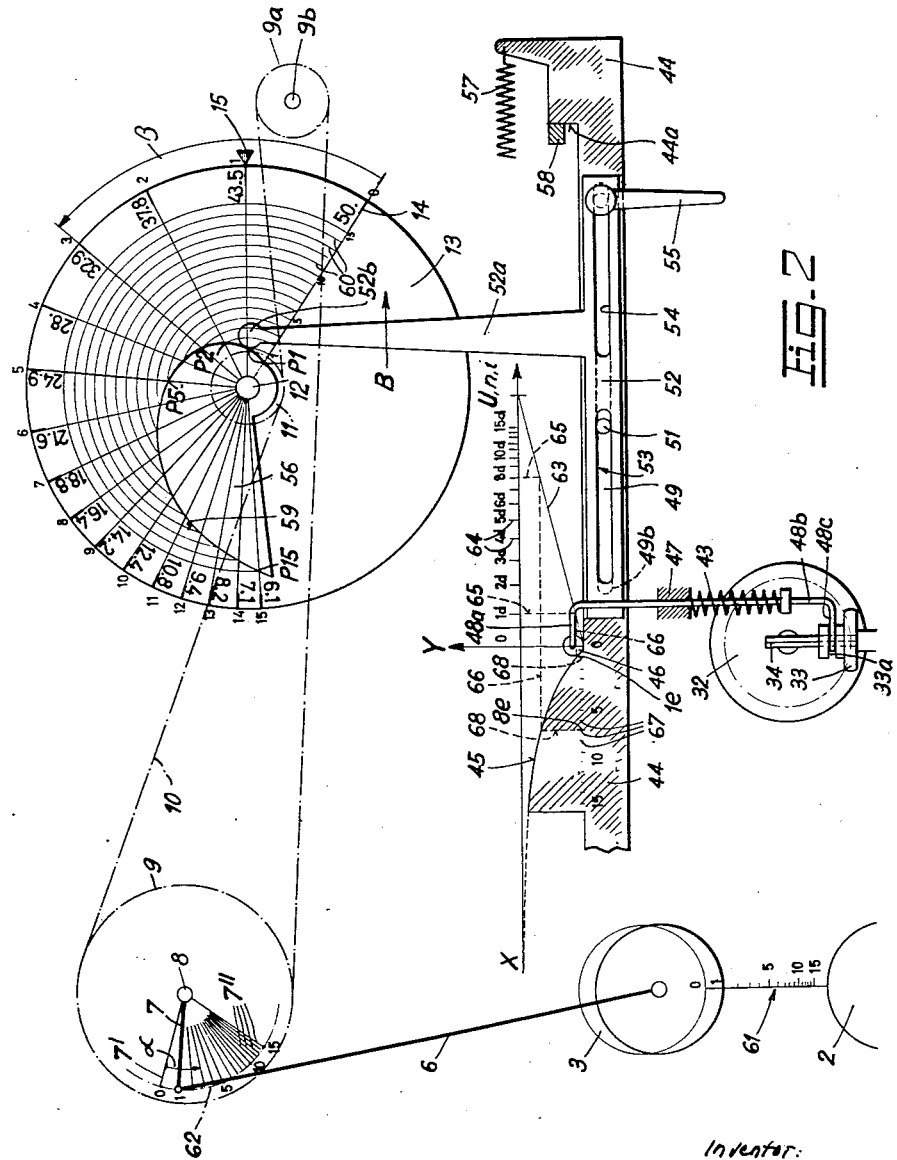

United States Patent Office 3,023,714
Patented Mar. 6, 1962

3,023,714
CONTROL MECHANISM FOR TRANSMISSIONS
AND THE LIKE
Gustave A. Seewer, Heimiswilstrasse 42,
Burgdorf, Switzerland
Filed Oct. 21, 1958, Ser. No. 768,585
Claims priority, application Switzerland Oct. 31, 1957
11 Claims. (Cl. 107—12)

The present invention relates to a control mechanism for transmissions and the like in general, and more particularly to a control mechanism in which displacements, either angular or linear, of a regulating member for one, two, three or more units of adjustment from its original or zero position bring about changes in transmission ratio which correspond to the first, second, third and higher powers of a predetermined unit transmission ratio, i.e., to the terms of a geometric progression. Stated in another way, the invention relates to a control system in which equal angular or linear displacements of a regulating member bring about changes in the ratio of transmitted motion, the changes corresponding to that power of a predetermined unit or common ratio which equals numerically the number of unit distances for which the controlling or regulating member is moved from its zero position.

An important object of the present invention is to provide a control and adjusting system which is particularly suitable for use in various roller mills or other types of machinery in which the peripheral or angular speed of a controlled element should be changed at a given ratio with respect to the speed and/or position of another element.

Another object of the invention is to provide a control system whose range of operation may embrace a given or an infinite number of different transmission ratios.

An additional object of the instant invention is to provide a control system which is capable of adjusting the speeds of intake conveyors in a roller mill, in a dough roll-down machine or the like in such a manner that the intake conveyors are driven at a speed proportionally less than the sped of discharge conveyors, the proportional reduction in the speed of intake conveyors as compared with the speed of discharge conveyors being such as to equal the ratio between the thicknesses of a sheet-like workpiece after and before the treatment, respectively.

A further object of my invention is to provide a simple and accurate method of determining the configuration of various component parts which enable the control system to operate in the hereinabove outlined manner.

A still further object of the invention is to provide a control system of the characteristics above set forth which is extremely simple, practical, capable of a great variety of uses, and which may be readily installed in rolling mills and similar apparatus of known construction.

A concomitant object of the invention is to provide a control and driving system which is capable of simultaneously adjusting two or more controlled elements in that it can control the transmission ratios of more than a single controlled device.

With the above objects in view, the invention resides essentially in the provision of driving arrangement which comprises means for producing and varying a motion, such as angular motion, a regulating member so installed that it may perform a series of angular or linear movements of given magnitudes, a controlled device driven by the motion producing means and a connection between the motion producing means and the regulating member which operates in such manner that the speed transmitted by motion producing means to the controlled or driven means changes according to a given power of a predetermined unit transmission ratio whenever the regulating member is moved a given number of unit distances from its original or zero position. The means for varying motion transmitted to the controlled means may include a friction wheel drive; a stepless drive; a stepped drive; a system of gears; a hydraulic system whose valve, motor or pump is controlled by the regulating member; and so forth. The regulating member, in turn, is controlled by a cam device or adjusting member of specific configuration which, while performing angular movements about a fixed axis, causes the regulating member to perform the aforementioned angular or linear movements from its original or zero position. In addition to controlling the movements of regulating member, the adjusting member or cam device may simultaneously control movements of a second controlled device again at a ratio corresponding to a given power of a transmission ratio, that is, in accordance with the terms of a geometric progression. The unit transmission ratio is the common ratio of geometric progression.

The operative connection between the regulating member and the variator or motion transmitting system may comprise a cam surface of suitable configuration, preferably forming part of or connected with the regulating member, and a follower which scans the cam surface and is directly or indirectly connected with the movable element or elements of the variator, e.g. with the follower of a crown friction gear system, to move the follower toward or away from the center of the disk and to thereby change the transmission ratio according to the momentary position of the variator follower with respect to the cam-surface which describes translatory or angular movements with the regulating member. The function of the regulating member is to control a variator or transmission for one type of movement, e.g. angular movement, by performing translatory or angular movements which are a multiple of a unit displacement in response to movements of a control cam or adjusting member about a stationary axis. By moving the cam about its axis through successive angles whose magnitudes equal the terms of a geometric progression, the ratio of transmission controlled by the regulating member, too, will vary according to the terms of a geometric progression if the operative connection between the regulating member and transmission or variator is so selected that equal displacements of regulating member brings about changes in transmission ratio which are proportional with that power of a unit transmission ratio whose numerical value corresponds to the total distance of regulating member from its original or zero position divided by the unit distance of its displacement.

Certain other features of the invention reside in the provision of means for constantly urging the regulating member into its initial or zero position; in the provision of a convenient method of designing the cam surface of the regulating member; in the provision of specific driving connections between the variator system and the driven or controlled means; in the provision of a method of designing the cam device which controls the movements of regulating member; in the specific arrangement of operative connection between the variator and the regulating member; in specific configuration of means for operatively connecting the regulating member with the controlling cam disc; and many others.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings, in which:

FIG. 1 is perspective view of a machine for rolling down a sheet of dough or the like to a sheet of lesser thickness which embodies my novel driving and speed adjusting apparatus; and FIG. 2 is schematic representation of certain elements constituting component parts of the apparatus.

Referring now in greater detail to the drawings, and first to FIG. 1, the roll-down machine therein shown comprises a frame or housing 1 supporting a lower roller 2 and an upper roller 3. Lower roller 2 is coaxially mounted on and rotates with a horizontal shaft 17 which latter is held against any but angular movements in machine frame 1. The upper roller 3 is vertically movable with respect to lower roller 2 and, to that end, is mounted on a horizontal shaft 4 which extends through vertical closed slots or cutouts 5 provided in housing or frame 1. Externally of the machine frame, shaft 4 is rotatably received in suitable bearings at the lower ends of thrust rods 6 whose upper ends, in turn, are articulately connected with crank arms 7. Members 7 of crank system 6, 7 are rigidly fixed to and are swingable with a shaft 8 supporting a driving sprocket 9 which is driven by a chain 10 traveling in an endless path about member 9 and a second sprocket 9a on shaft 9b when a pinion 11 on shaft 12 is turned by a hand wheel 13. Pinion or gear 11 engages the adjacent stringer of chain 10 and advances the latter in clockwise or anticlockwise direction depending upon whether the upper roller 3 is to be moved away or toward the lower roller 2, respectively. In the embodiment of FIG. 1, the hand wheel 13 causes movements of roller 3 toward member 2 when it is rotated in clockwise direction. Member 13 carries a scale 14 which, together with a stationary pointer 15, indicates to the operator the distance, or the width of gap A, between rollers 2 and 3.

Rollers 2, 3 are driven by a means for producing angular motion, such as a pole-changeable or reversible electric motor 16 which is coupled with shaft 17 of member 2. Shaft 17 carries a gear 18a meshing with gear 18b on Cardan shaft 19 which latter is articulately connected with and rotates shaft 4 of upper roller 3. Thus, shaft 17 directly drives roller 2 and, over members 18a, 18b, 19 and 4 in that order, also causes rotation of upper roller 3 at the same angular speed, gear 18a rotating gear 18b at the one-to-one ratio.

Machine frame 1 further supports a pair of driven means in the form of endless band conveyors 20, 21 which travel over rollers 22, 24 and 23, 25, respectively. The two conveyors are disposed at opposing sides of gap A formed between members 2 and 3. Driving or inner rollers 22, 23 are adjacent to, parallel with, and located at opposing sides of lower roller 2. The outer or deflecting rollers 24, 25 of respective conveyors 20, 21 are rotatable in machine frame 1 and merely follow angular movements of driving rollers 22, 23, respectively. In operation, conveyer 21 may transport a sheet of dough or another material toward and into the gap A wherein the thickness of sheet is reduced to the extent determined by setting of hand wheel 13, whereupon the sheet travels onto the other conveyer 20. It will be understood that the operation may proceed in reverse direction, i.e. from conveyer 20 onto conveyer 21. It is assumed in this description that the direction of travel is from conveyer 21 to conveyer 20; thus, the conveyer 20 at the discharge or exit side of gap A must rotate at the exact peripheral speed of rollers 2 and 3 while the conveyer 21, adjacent to the inlet or intake side of gap A, must rotate at a peripheral speed less than the speed of conveyer 20. The ratio between the speeds of conveyers 20 and 21, and hence also the ratio between the speed of rollers 2, 3 and that of conveyer 21, equals the ratio between the respective thicknesses of dough sheet before and after its passage between rollers 2, 3. This will be readily understood since the reduction in thickness brings about a corresponding increase in length of the dough sheet, i.e. the so-called "discharge" conveyer must remove the sheet of reduced thickness at the rate at which rollers 2 and 3 deliver same, whereas the speed of so-called "intake" conveyer must be less since a relatively short but relatively thick sheet is transformed in gap A into one of lesser thickness but increased length.

The drive system 26–31 rotates that conveyer which is adjacent to the discharge side of gap A. Thus, when the roller 2 rotates in anticlockwise direction, conveyer 20 is driven at the same peripheral speed by sprocket 26 on shaft 17 which, over endless chain 27, drives a pair of sprockets 28, 29 on shafts 28a, 29a of respective driving rollers 22, 23. Sprockets 28, 29 are connectable for rotation with their shafts 28a, 29a by means of freewheel coupling systems 30, 31, respectively. The couplings 30, 31 are so arranged that, in the embodiment of FIG. 1, shaft 28a is driven by system 30 at the exact speed of sprockets 26 and 28, while the sprocket 29 merely rides over the inactive coupling 31 without rotating the shaft 29a of driving roller 23.

The problem arises when the peripheral speed of conveyer (e.g. 21) at the intake end of gap A must be determined. As before stated, the "intake" conveyer must be driven at a lower peripheral speed the exact rate of which is dependent upon the width of gap A i.e. upon the distance between rollers 2 and 3. The calculation of peripheral speed of conveyer at the intake end is quite difficult when the width of gap is not changed according to a preceding calculation, i.e. according to a plan which is determined in advance, but simply at will, e.g. when the width of slot A changes after the passage of each successive sheet without consulting a chart or the like which would indicate in advance, based on rather complicated calculations, that a certain peripheral speed of the so-called "intake" conveyer corresponds to a given width of gap A. It would appear at first thought that, whenever the distance between rollers 2 and 3 is changed, one would have to calculate the quotient obtained by dividing the distance between rollers 2, 3 before each change with the distance between said rollers after each change, and to thereupon apply the quotient in a suitable manner to the speed controls of system which drives the rollers of "intake" conveyer, e.g. roller 23 of conveyer 21. This would also render it necessary to memorize, or to make a record of, the last distance between rollers 2 and 3, i.e. before a change was made, in order to thereupon determine the aforementioned quotient between the width of gap A before and after each change. Without very complicated calculating machines or lengthy on-the-spot mathematical operations, the problem of properly setting the speed of "intake" conveyer was believed to be unresolvable.

According to the present invention, this problem of so adjusting the speed of "intake" conveyer in a fully automatic way that it always remains proportionally lower than the peripheral speed of rollers 2, 3 and of the "discharge" conveyer, is solved in a surprisingly simple manner not only as regards its mathematical solution, i.e. the theoretical principle or concept underlying the invention, but also as regards the practical embodiment of a driving and speed adjusting apparatus wihch operates on the basis of my novel concept. The solution has been arrived at by the following reasoning:

By starting from an initial magnitude of gap A between rollers 2 and 3 which can be designated as $W_0$, the magnitude $W_x$ of each different gap may be expressed by the formula $$W_x = W_0 \cdot a^x$$

wherein $a$ is a constant which will hereinafter be called "unit transmission ratio" or "unit adjustment ratio" depending upon whether, in a narrower sense, the desired ratio is arrived at by utilization of a transmission or variator system (which may be of the infinitely variable or stepped type) or, in a broader sense, by utilization of any suitable power system whose angular speed is adjustable.

In the following example, the value of unit transmission ratio or constant $a$ is given as 0.87. Also, in order to facilitate the understanding of the example, a concrete case has been selected according to which $W_0=50$ mm. and $U_0$ (peripheral speed of rollers 2, 3 and of the "discharge" conveyer) equals 50 meters per minute.

Accordingly, when $x=0$, $a^x=1$ and $W$ (in millimeters) $=50$. The magnitudes of $a^x$ and $W_x$ for progressively higher values of $x$ can be read in the following tabulation:

| $x$ | $a^x$ | $W_x$ (mm.) |
| --- | --- | --- |
| $x_0=0$ | 1 | $W_0=50$ |
| $x_1=1$ | 0.87 | 43.5 |
| $x_2=2$ | 0.757 | 37.8 |
| $x_3=3$ | 0.659 | 32.9 |
| $x_4=4$ | 0.572 | 28.05 |
| $x_5=5$ | 0.498 | 24.9 |
| $x_6=6$ | 0.434 | 21.65 |
| $x_7=7$ | 0.377 | 18.8 |
| $x_8=8$ | 0.328 | 16.4 |
| $x_9=9$ | 0.285 | 14.2 |

If the sheet material, while passing through the gap A, is to be reduced from a thickness $W_0-50$ mm. down to a thickness of 14.4 mm. and, as above stated $U_0$ of rollers 2 and 3 is 50 m./min., the speed of feeding or "intake" conveyer 21 is calculated as follows:

$$U = \frac{16.4}{50} \cdot U_0 = 0.328 \cdot U_0 = a^8 \cdot U_0$$

If, in the roll-down of the same sheet material, the latter's thickness while passing through the gap A is first reduced from 50 mm. to 37.8 mm. and thereupon in another pass from 37.8 mm. again down to 16.4 mm., the U (i.e. the peripheral speed) of "intake" conveyer 21 during the first passage equals $$U_1 = \frac{37.8}{50} \cdot U_0 = 0.757 \cdot U_0 = a^2 \cdot U_0$$

and, during the subsequent passage, $$U = \frac{16.4}{37.8} \cdot U_0 = 0.434 \cdot U_0 = a^6 \cdot U_0$$

If, in a different operation, the thickness of a sheet material should first be reduced from 50 mm. to 43.5 mm., thereupon in a second step from 43.5 mm. to 32.9 mm., and finally in a third step from 32.9 mm. to 16.4 mm., then, in the first phase, the speed $U_1$ of feeding or "intake" conveyer is calculated as follows:

$$U_1 = \frac{43.5}{50} \cdot U_0 = 0.87 \cdot U_0 = a^1 \cdot U_0$$

In the second phase, $$U = \frac{32.9}{43.5} \cdot U_0 = 0.757 \cdot U_0 = a^2 \cdot U_0$$

In the third phase, $$U = \frac{16.4}{32.9} \cdot U_0 = 0.498 \cdot U_0 = a^5 \cdot U_0$$

It will be noted that $x_8=x_2$, $x_6=x_1-x_2-x_5$. In other words, the solution can be expressed by the formula $a^y \cdot z^z = z^{y+z}$, or $$\frac{a^y}{a^z} = a^{y-z}$$

i.e. either by an addition or a subtraction of powers.

In the embodiment of FIG. 1, the apparatus for setting the speeds U of controlled means or "intake" conveyer, starting from the peripheral speed $U_0$ of rollers 2 and 3, comprises a stepless or infinitely variable speed adjusting device in the form of a transmission or variator which, in order to facilitate understanding of the principle on which the system is based, is shown as a simple crown friction gear drive including a first friction disk or wheel 32 which is fixed to shaft 17 of lower roller 2. The diameter of wheel 32 equals that of member 2. It is in frictional engagement with a second friction wheel or follower 33 which is non-rotatably mounted on a jack shaft 34 of non-circular, e.g. square, cross-sectional contour. The axis of shaft 34 is perpendicular to the axis of shaft 17 and, in the embodiment of FIG. 1, is shown in vertical position. Friction wheel or follower 33 is axially slidable on shaft 34 and has a diameter equal to that of driving roller 22 or 23. The driving connection between wheel 33 and driving rollers 22, 23 includes a bevel gear 35a rigidly mounted on shaft 34, a second bevel gear 35b meshing with member 35a and rigidly mounted on a horizontal shaft 36 which latter is rotatably supported in machine frame 1 and is parallel with shaft 17, a sprocket 37 rigidly fixed to shaft 36, and an endless chain 38 travelling over sprocket 37 as well as over sprockets 39, 40 mounted on shafts 28a, 29a of driving rollers 22, 23, respectively. Electromagnetic couplings 41, 42 are interposed between sprockets 39, 40 and shafts 28a, 29a, respectively. The transmission ratio between bevel gears 35a, 35b as well as between sprockets 37, 39, 40 is one-to-one. The switches (not shown) which control electromagnetic systems 41, 42 are preferably coupled with the reversing switch (not shown) of electric motor 16. The coupling 41 which controls driving roller 22 and conveyer 20 operates when the roller 2 rotates in anticlockwise direction while, when the member 2 rotates clockwise, coupling 42 positively controls the roller 23 of conveyer 21.

It will now be seen that, when the friction wheel 33 is in the position of FIG. 1, i.e. in contact with the outermost portion of friction surface on friction wheel 32, the transmission ratio $a_0=1$. In other words, rollers 2, 3 and the driving roller 23 of feeding or "intake" conveyer 21 rotate at the same peripheral speed.

The displacement of friction wheel or follower 33 toward the center of friction wheel or disk 32 occurs against the force of a constantly acting resilient element 43 and is brought about by a shifting or regulating member 44 which latter is formed with a cam surface 45, as well as by a shifting rod 48. The shape of member 48 approximates that of a letter U turned through 90 degrees; its upper horizontal leg 48a carries a follower roller 46 which is in contact with the cam surface 45; its base or vertical leg 48b is axially slidably received in a stationary bearing member 47 and is coaxially received in the resilient element 43 which is given the shape of a helical spring; and its lower horizontal leg 48c has a free end which is bifurcated to receive a reduced or neck zone 33a of friction wheel or follower 33. Thus, the operative connection between transmission or variator 32, 33 and regulating member 44 consists of follower 46 and rod 48. Spring 43 operates between the lower horizontal leg 48c and stationary bearing member 47, and thus constantly urges friction wheel 33 into its lowermost position in which the driving roller connected therewith over one of coupling systems 41, 42 is driven at the exact speed of roller 2, i.e. at the speed of friction wheel 32. As will be explained hereinafter, the configuration of cam surface 45 depends merely upon the shifting or transmission characteristics (ratio $a$) of variator or transmission utilized in connection with my speed adjusting and controlling apparatus; therefore, by suitably selecting the configuration of cam surface 45, any commercially available speed variator may be utilized with the condition that its transmission ratio be variable within a sufficiently large range and that it be capable of transmitting a sufficiently large angular momentum over its entire transmission range.

In the embodiment of FIG. 1, regulator means 44 has been given the shape of a coulisse or rocker arm defining a pair of elongated closed slots or cutouts 49a, 49b (the latter shown in FIG. 2) for reception of guide bolts or pins 50, 51, respectively, which are rigidly fixed to machine frame 1. Guide bolt 51 also extends into a closed slot 53 formed in a sensing element or feeler 52. Member 52 defines a second closed slot 54 which is aligned with slot 53, adjacent to slot 49b, and receives a tightening screw or coupling lever 55. A vertical arm 52a of sensing element 52 has a suitably shaped end portion or follower 52b which is in contact with the profile or end face 59 of a cam disk 56 rigidly fixed to shaft 12 of hand wheel 13. As is best shown in FIG. 2, the length of regulating member 44 is such that its closed slot 49b also receives the tightening or coupling screw 55 which latter thus releasably connects regulator 44 with sensing element 52. When the screw 55 is drawn tight and the hand wheel 13 is rotated in clockwise direction, sensing element 52 and regulating member 44 are moved by the cam disk 56 on shaft 12 in the direction of arrow B, surface 59 engaging with the projection 52b on the vertical arm 52a of sensing element 52. Cam surface 45 of regulating member 44 then lifts the follower 46 together with its rod 48 and displaces friction wheel 33 in upward direction toward the center of friction wheel 32; thus, the transmission ratio of variator 32, 33 is reduced. As before stated, the arrangement of FIG. 1 is such that a clockwise angular movement of hand wheel 13 brings about movement of upper roller 3 toward the lower roller 2, i.e. the width of gap A at the operating station decreases proportionally with the decrease in transmission ratio of variator assembly 32, 33. If the coupling screw 55 is thereupon released, a resilient element 57 in the form of a contraction spring immediately returns regulating member 44 and hence also the friction wheel 33 into their respective original or zero positions which are illustrated in FIG. 1, i.e. in which $U/U_0=1$ or the peripheral speed of roller 2 corresponds to that of the driving roller forming part of the controlled means or "intake" conveyer. The extent to which the regulating member 44 can travel in direction to left, i.e. in the direction opposed to that indicated by arrow B, is determined by a stop bar or rod 58 which abuts against a shoulder 44a on member 44. The broken-away end portions of spring 57 and of rod 58 are connected to machine frame 1.

The preceding part of the description has already indicated the very important functions performed by the profile or end face 59 of cam disk 56 which brings about displacements of regulating member 44 and consequent changes in the transmission ratio of variator 32, 33. This profile is determined by full consideration of preceding calculations as well as by the specific arrangement of means (parts 4–11) for causing vertical displacements of upper roller 3, and especially of the arrangement of articulately connected crank system 6, 7. In order to displace regulating member 44 from its original or zero position, the cam disk 56, and more particularly its profile or end face 59 is so designed that it, too, is moved from a given initial position through successive angles or units of adjustment whose magnitude corresponds to the product obtained by multiplying the magnitude of preceding unit of adjustment with the unit adjustment or transmission ratio. As before stated, regulating member 44 is returned into its zero position before each new setting of upper roller 3 by spring 57 upon release of coupling or tightening screw 55. In FIG. 2, the graduations or units of adjustment described by cam disk 56 are shown as portions of circles on scale 60 and correspond to linear displacements of cam surface 45 on member 44. Also, the position of cam disk 56 in FIG. 2 is assumed to be the latter's position No. 2, it being presupposed that the sheet material has already been passed once through the gap A between rollers 2 and 3 whereby its thickness was reduced from 50 mm. to 43.5 mm. Finally, the graduations or units of adjustment on scale 60 above referred to are represented in FIG. 2 as angles of rotation.

In the illustrated embodiment, the curvature or configuration of cam profile 59 is brought into a predetermined relation with the magnitude of gap A by means of crank drive 6, 7. The numerical expression of relations or ratios corresponding to each angular position of cam profile 59 is a factor which influences the aforementioned product in such manner that, when the magnitude of gap A, starting from a predetermined maximum magnitude, is changed (i.e. reduced) at an arbitrary rate, the transmission ratio of the drive for "intake" conveyer (i.e. the transmission ratio of variator 32, 33) is reduced at the same rate by the displacement of regulating member 44 from the latter's zero or starting position due to the angular displacement of cam profile 59. In the specific arrangement shown in FIGS. 1 and 2, the fact that the configuration and relative positioning of crank drive 6, 7 also influence the product, i.e. that they appear as a factor in the product, finds its expression in that, when the magnitude of gap A is reduced in accordance with a geometrical progression, the factor corresponding to the influence of crank assembly 6, 7 increases to cause a rise of the cam profile 59 which is therefore less pronounced than if the crank system 6, 7 were replaced by a toothed gear system.

The determination of cam profile 59 is a rather simple procedure. In FIG. 2, scale 61 indicates the progressively diminishing magnitudes of gap A in accordance with the higher powers of aforementioned constant $a=0.87$. The corresponding angular positions of crank arm 7 may be read on scale 62. Angles α between the initial or zero position 7' of arm 7 and each successive position 7" of said arm may be read on scale 62 and, by multiplying same with the transmission ratio of chain drive 9–11, the so obtained products or values can be shown as angles β on scale 60, starting from the initial position of cam profile 59, i.e. in which the zero point on scale 14 coincides with the tip of pointer 15. It will be noted in FIG. 2 that the tip of pointer 15 coincides with point 1 of scale 14; thus, the transmission ratio $a^1$ of variator 32, 33 is 0.87. The intersections of circles numbered 1–15 on scale 60 with the traveling shank of a corresponding angle β constitute points $P_1$–$P_{15}$ on the profile 59 of cam disk 56.

The determination of curvature on cam surface 45 of regulating member 44, too, is a rather simple procedure. The characteristic transmission line 63 of variator 32, 33 passes through the zero point on cam surface 45 in such manner that the point corresponding to the regulating or transmission ratio 1 of transmission characteristic coincides with the zero point of cam surface 45. The X-axis of a rectangular coordinate system carries a scale 64 and is parallel with the direction in which the regulating member 44 moves. Scale 64 indicates the values of peripheral speed U, of angular speed n, or of the transmission ratio i corresponding to the momentary magnitudes of gap A. Thus, and referring to points 1d and 8d on scale 64, ordinates 65 parallel with the Y-axis are drawn between these points and the characteristic transmission line 63; lines 66, parallel with the X-axis, extend from intersections between line 63 and lines 65 and intersect lines 68 which latter are parallel with the Y-axis and pass through the corresponding graduations 1e, 8e on scale 67. The graduations on scale 67 are equidistant. The curve connecting points of intersection between lines 66 and 68 defines the cam surface 45 of regulating member 44.

Owing to such configuration of cam surface 45 on regulating or adjusting member 44 which latter controls the variator 32, 33, the displacements of member 44 for 1, 2, 3 ... n equal units of adjustment or increments (see scale 67) from its zero or initial position in which the transmission ratio of variator 32, 33 is one-to-one, the transmission ratio becomes equal to the first, second, third, ... nth power of the predetermined common unit regulation or transmission constant or ratio a.

As before stated, the crown friction wheel system or variator 32, 33 has been selected merely for the sake of simplicity because its transmission or adjustment characteristic 63 can be represented as a straight line. However, as will be readily understood from the preceding explanation of the method according to which the cam surface 45 is determined, any other type of transmission or variator with constantly increasing variation characteristic can be utilized because, if the characteristic 63 would be a curve instead of being a straight line, this would merely bring about a somewhat modified configuration of cam surface 45. Moreover, the driving system consisting of constant-speed motor 16 and a suitable transmission may be replaced by a different driving system with constantly increasing adjustment characteristics and with a sufficiently large range of rotational speeds. The only change would be in that a curve symbolic of the constantly changing transmission characteristic would have to replace line 63 in FIG. 2. As examples of such modified driving systems may be mentioned variable and reversible electric motors, for example, those known as Ward-Leonard regulators; hydraulic drives such as those utilizing a pump, a hydraulic motor, and a volume control valve which latter is disposed between the pump and the motor, and is connected with and controlled by regulating member 44; a wobble pump controlled by member 44; or a wobble-plate engine also controlled by member 44.

Again referring to the illustrated embodiment, a number of additional specific examples in line with those given hereinbefore will now be explained in connection with the illustration of FIG. 2 to show certain specific instances in which the novel transmission control system can be put to actual use.

*Example I*

The gap A should be of such magnitude as to reduce the thickness of sheet material from 50 mm. down to 16.4 mm. in a single operation. By corresponding angular adjustment of hand wheel 13, the gap A is directly reduced from a width of 50 mm. down to that of 16.4 mm., i.e. the pointer 15 coincides with point 8 on the periphery of scale 14. Cam disk 56 is rotated through the same angle as wheel 13, i.e. over eight successive angular positions and the sensing element 52 together with regulating member 44 is moved a distance corresponding to eight equal units of adjustment which, owing to the chosen transmission characteristic 63, brings about a reduction in transmission ratio of transmission or variator 32, 33 from 1 down to $a^8$ or 0.328.

*Example II*

The thickness of sheet material at operating station 2, 3 should be reduced in two consecutive operations first from 50 mm. to 37.8 mm. and thereupon from 37.8 mm. down to 16.4 mm.

As in Example I, in the first phase members 44 and 52 are moved together from their zero or initial positions a distance corresponding to two units of adjustment in a direction to right (see arrow B in FIG. 1) whereby the transmisison ratio is reduced from 1 down to $a^2$ or 0.757.

In the second phase, upon release and subsequent tightening of coupling screw 55 whereby the member 44 is returned by spring 57 into its initial or zero position, the distance between upper roller 3 and lower roller 2 is reduced from 37.8 mm. down to 16.4 mm., i.e. the upper roller 3 is moved by hand wheel 13 a distance corresponding to six graduations on scale 61 (from graduation 2 to graduation 8) whereby the regulating member 44, too, is moved a corresponding distance equal to six units of adjustment on scale 67, so as to change the transmission ratio of transmission variator 32, 33 from 1 down to $$a^6 = 0.434 = \frac{16.4}{37.8}$$

*Example III*

The roll-down of a sheet should be carried out in three separate phases (a) from 50 mm. to 43.5 mm., (b) 43.5 mm. to 32.9 mm., and (c) from 32.9 mm. down to 16.4 mm.

In the first phase, members 44, 52 are moved simultaneously to right a distance equal to one unit of adjustment on scale 67 whereby the transmission ratio of variator 32, 33 is reduced from 1 down to $$a^1 = 0.87 = \frac{43.5}{50}$$

In the second phase, member 44 is first permitted to return into its initial position upon release of coupling lever 55 which enables the spring 57 to act, whereupon member 44 is again fixed to member 52 by the drawntight lever 55. Regulating member 44 is then moved a distance corersponding to the combined length of two equal units of adjustment on scale 67 while the sensing element 52, whose position remained unchanged while the member 44 was returned into its zero position between the first and second phases, also moves with member 44 when the latter moves to right under the influence of cam disk 56 which is moved from a position in which the tip of stationary pointer 15 coincides with graduation 1 on the periphery of scale 60 into a position to move graduation 3 into alignment with pointer 15. The transmission ratio of variator 32, 33 is thereby reduced from 1 to $$a^2 = 0.757 = \frac{32.9}{43.5}$$

In the third phase, after the regulating member 44 was again returned into its zero position, sensing element 52 together with member 44 is moved a distance corresponding to five equal units of adjustment on scale 67 in the direction of arrow B; thus, the total displacement of element 52 now equals eight units as compared with five units of adjustment for member 44. The transmission ratio of variator 32, 33 is reduced from 1 down to $$a^5 = 0.498 = \frac{16.4}{32.9}$$

If a stepless variator system is utilized, such as the assembly 32, 33, any desired intermediate magnitudes of gap A may be set in the mechanism since the mathematical formula ($a^y \cdot a^z = a^{y+z}$) on which the operation of control system is based, is equally applicable when y and z represent values other than whole numbers.

If the machine is to operate with a finite number of various settings for the magnitude of gap A, i.e. as in the preceding examples between a maximum gap opening of 50 mm. and, over 8 proportionately smaller gaps, a minimal gap magnitude or width of 14.2 mm., the variator may be a stepped drive, such as a system of pairwise arranged gears whose meshing gear pairs transmit angular motion at ratios corresponding to the terms of geometric progression above referred to.

As already explained, the mounting of regulating member 44 is such that, before each new setting of gap A, i.e. for each different setting of speed at which the feeding or "intake" conveyor or controlled member should rotate, coupling screw 55 must be released to permit return of member 44 into its initial position, and is thereupon again drawn tight to connect members 44 and 52 for movement whenever the angular position of cam disk 56 changes. It will be understood, however, that it is equally possible to provide means (not shown) for automatically returning member 44 into its initial position before each change in the angular position of hand wheel 13. The latter is preferably combined with an arresting system (not shown) which may be rendered inactive by a suitably mounted resilient element or the like, its function being to prevent unintentional or accidental changes in the magnitude of gap A. For example, by replacing member 55 with an electromagnetic coupling device, the just mentioned arresting system for wheel 13 may be installed in the circuit of the coupling device in such manner that, whenever rendered inactive, it shortly breaks the circuit of the magnet and permits spring 57 to return member 44 into its zero position. It will also be noted that the members 44 and 52 need not perform a linear motion as in the machine of FIG. 1, but may be releasably connected to each other by coupling member 55 or an equivalent thereof for angular movements about a stationary axis, if desired. In either case, cam 56, sensing element 52, regulating member 44, follower 46 and rod 48 will bring about changes in the ratio of transmission 32, 33 which are directly proportional with changes in distance between rollers 2, 3. Thus, changes in relative positions of two elements which differ from each other as the terms of a geometric progression are conveyed to a rotating transmission so that the various transmisson ratios, too, differ from each other as the terms of a geometric progression.

Additional modifications will readily occur to men skilled in the art. Thus, it is possible to provide control means which permit changes in the magnitude of gap A only in a given sequence, either in a semi- or fully automatic way. Such devices have not been shown because they would merely obscure the basic structure of my invention. In addition, the machine shown in FIG. 1, while described as a roll-down apparatus for dough, can be utilized in connection with a great variety of other sheet materials which require one or more reductions in thickness with anywhere between one and an infinite number of intermediate settings. For example, the control system may be utilized in sheet rolling mills with spool or reel chains in which the means for delivering sheet material whose thickness is to be reduced at the operating station are driven at a speed less than that of discharge means. Similarly, the control and drive system may be combined with a continuous roller mill comprising a series of rolling stands. The rollers in stands preceding the last one are driven by the control system at progressively reduced angular speeds. In other words, the system then controls rollers corresponding to members 2, 3 in FIG. 1 instead of conveyer bands or the like. Accordingly, my invention will find application whenever and wherever angular or peripheral speeds of a controlled member or of a series of members must be changed at a rate proportional with changes in the position of a controlling member which latter performs translatory or angular movements of given magnitudes.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In combination: means for producing a motion; controlled means; a variator for connecting said motion producing means with said controlled means, said variator having a plurality of transmission ratios for imparting at different rates motion to said controlled means; regulator means having a zero position and adapted to be moved from said zero position into a plurality of successive positions equidistant from each other; means for connecting the regulator means with said variator in such manner that movements of the regulator means from the zero position into said successive positions bring about changes in transmission ratio of said variator, the transmission ratios of said variator corresponding to the successive positions of said regulator means differing from each other as the first, second, third and higher powers of a predetermined unit transmission ratio; cam means turnable about a fixed axis and having a profile; and a separable connection between said regulator means and said profile for moving the regulator means into said successive positions in response to turning of said cam means from an initial position through a number of increments into a series of successive positions whose distances from said initial position differ from each other as the products of the value of the preceding increment multiplied by said unit transmission ratio.

2. In a control system, in combination: a regulating member having a zero position and being displaceable from said zero position into a series of successive positions each equidistant from the preceding position; resilient means for constantly urging the regulating member into said zero position; a sensing element; releasable coupling means for connecting said regulating member with said sensing element; and a turnable cam having a profile in contact with said sensing element, the configuration of said profile being such that upon turning of said cam from an initial position through successive increments into a series of successive positions, the distances between which equal the products of the value of the preceding increment multiplied by a constant, bring about displacements of the regulating member into said successive equidistant positions.

3. In a driving arrangement, in combination: a crown friction gear system comprising a disk and a follower movable toward and away from the center of said disk whereby to change the trransmission ratio of said system; a regulating member having a zero position corresponding to the one-to-one ratio of said system and adapted to be moved from said zero position into a series of successive positions equidistant from each other; a first cam connected with said regulating member; means connected with said follower and in contact with said cam for moving the follower toward the center of said disk when the regulating member is moved from said zero position, the configuration of said cam being such that the transmission ratio of said system changes in accordance with the first, second, third and higher power of a predetermined unit transmission ratio when the regulating member is moved from the zero position into said successive positions; a second cam turnable about an axis and having a profile; and a separable connection between said profile and said regulating member for moving the latter into said successive positions when said second cam is turned, the configuration of said profile being such that turning of the second cam from an initial position corresponding to the zero position of said regulating member through a series of successive increments whose magnitudes equal the products of the value of the preceding increment multiplied by said unit transmission ratio brings about movements of the regulating member into said successive equidistant positions and consequent changes in the transmission ratio of said system.

4. An apparatus for reducing the thickness of a ductile material such as dough sheets and the like, said apparatus comprising, in combination, means defining a rolling gap for the material; first adjusting means for adjusting the width of said gap between a maximum magnitude and a plurality of lesser magnitudes; intake conveyor means for advancing the material toward and into said gap; drive means; adjustable speed transmission means connecting said drive means with said conveyor means for advancing the latter at different speeds, said transmission means having a basic transmission ratio and a plurality of adjusted transmission ratios; second adjusting means operatively connected with said first adjusting means for automatically adjusting the transmission ratio of said transmission means in response to an adjustment in the width of said gap; and means for restoring the basic transmission ratio of said transmission means independently of said first adjusting means.

5. An apparatus for reducing the thickness of a ductile material such as dough sheets and the like, said apparatus comprising, in combination, roller means defining a rolling gap for the material; first adjusting means operatively connected with said roller means for adjusting the width of said gap between a maximum magnitude and a plurality of lesser magnitudes; intake conveyor means for advancing the material toward and into said gap; drive means; adjustable speed transmission means connecting said drive means with said conveyor means for advancing the latter at different speeds, said transmission means having a basic transmission ratio at which the conveyor means is advanced at maximum speed and a plurality of adjusted transmission ratios at which said conveyor means is advanced at lesser speeds; second adjusting means operatively connected with said first adjusting means for automatically adjusting the transmission ratio of said transmission means in response to an adjustment in the width of said gap; and means for restoring the basic transmission ratio of said transmission means independently of said first adjusting means whereby the basic transmission ratio may be restored and the conveyor means may be advanced at maximum speed prior to each reduction in the width of said gap and the ratio of said transmission means may be automatically adjusted to advance the conveyor means at a speed decreasing proportionally with the reduction in the width of said gap.

6. An apparatus as set forth in claim 5, wherein said second adjusting means comprises a first component cooperating with said first adjusting means and a second component releasably connected with said first component and cooperating with said transmission means, said restoring means comprising means for automatically moving the second component to a predetermined position corresponding to the basic transmission ratio of said transmission means when said second component is disconnected from said first component and means for automatically connecting said components when the second component assumes said predetermined position.

7. An apparatus as set forth in claim 5, wherein said first adjusting means comprises a rotatable cam disk having a cam face and said second adjusting means comprises a first component for tracking said cam face and a second component releasably connected with said first component, said second component comprising a regulating member having a cam profile and a follower tracking said profile and operatively connected with said transmission means.

8. An apparatus as set forth in claim 7, wherein the configuration of said cam profile depends on the characteristic transmission line of said transmission means.

9. An apparatus as set forth in claim 7, further comprising means for releasably connecting said first component with said regulating member, said restoring means comprising spring means for permanently biasing said regulating member to an end position corresponding to the basic transmission ratio of said transmission means and means for arresting said regulating member in said end position.

10. An apparatus as set forth in claim 9, wherein the displacements of said regulating member against the bias of said spring means through 1, 2, 3 ... $n$ equal unit distances from said end position under the action of said first component correspond to the first, second, third ... $n$th powers of a predetermined unit transmission ratio.

11. An apparatus as set forth in claim 10, wherein said first adjusting means further comprises a crank mechanism operatively connected with said roller means and with said cam disk, the face of said cam disk being profiled in dependency on said unit transmission ratio and on the characteristics of said crank mechanism.

References Cited in the file of this patent
UNITED STATES PATENTS

| | | |
|---|---|---|
| 539,849 | Atwater | May 28, 1895 |
| 2,086,952 | Streckfuss | July 13, 1937 |
| 2,275,714 | Anetsberger et al. | Mar. 10, 1942 |
| 2,402,027 | Crowther | June 11, 1946 |
| 2,569,560 | Ford | Oct. 2, 1951 |
| 2,784,683 | Curtis et al. | Mar. 12, 1957 |
| 2,792,792 | Seewer | May 21, 1957 |
| 2,829,606 | Dielentheis | Apr. 8, 1958 |